United States Patent

[11] 3,573,759

[72] Inventors Arnold H. Silver
Farmington;
James E. Zimmerman, Dearborn, Mich.

[21] Appl. No. 796,303
[22] Filed Jan. 24, 1969
[45] Patented Apr. 6, 1971
[73] Assignee Ford Motor Company
Dearborn, Mich.
Continuation of application Ser. No.
537,239, Mar. 24, 1966, now abandoned.

[54] MAGNETIC FIELD COUPLED SUPERCONDUCTING QUANTUM INTERFERENCE SYSTEM
6 Claims, 7 Drawing Figs.

[52] U.S. Cl. .......... 340/173.1, 307/306
[51] Int. Cl. .......... G11c 11/44
[50] Field of Search .......... 340/173.1

[56] References Cited

UNITED STATES PATENTS

| | | | |
|---|---|---|---|
| 3,049,686 | 8/1962 | Walters | 340/173.1 |
| 3,335,363 | 8/1967 | Anderson | 340/173.1 |
| 3,419,712 | 12/1968 | Green | 340/173.1 |

*Primary Examiner*—Terrell W. Fears
*Attorneys*—John R. Faulkner and Thomas H. Oster

ABSTRACT: This disclosure relates to an electrical circuit component including a superconductive quantum interference device having a loop of superconducting material with a weak link positioned therein. The loop of superconducting material and the weak link enclose an area for the reception of magnetic flux. Means are positioned adjacent the superconductive quantum interference device for producing a varying magnetic field at the device to induce a current therein. The magnitude of the varying magnetic field is sufficient to induce a critical current in the weak link. As a result, the current induced in the superconductive quantum interference device alternately increases and decreases as the number of flux quanta changes in the area enclosed by the superconducting material and weak link.

The disclosure also relates to a process of inducing a nonlinear electric current in a superconductive quantum interference device having a loop of superconducting material with a weak link positioned therein. It comprises placing this device in a superconducting state and locating an inductive member magnetically adjacent thereto. A varying current is applied to the inductive device to induce a current in the superconductive quantum interference device. The magnitude of this varying current is sufficient to induce a critical current in the weak link, and, as a result, the current alternately increases to the value of the critical current through the weak link and decreases to some lower value as the number of flux quanta changes in the area enclosed by the superconducting material and weak link.

PATENTED APR 6 1971

3,573,759

ARNOLD H. SILVERS
JAMES E. ZIMMERMAN
INVENTORS

BY John R. Faulkner
Thomas H. Oster

ATTORNEYS

ARNOLD H. SILVERS
JAMES E. ZIMMERMAN
INVENTORS
BY John R. Faulkner
Thomas H. Oster
ATTORNEYS

MAGNETIC FIELD COUPLED SUPERCONDUCTING QUANTUM INTERFERENCE SYSTEM

This application is a continuation of now abandoned application, Ser. No. 537,239, filed Mar. 24, 1966, filed in the names of Arnold H. Silver and James E. Zimmerman.

This invention relates to the field of superconductivity and is particularly concerned with a process for the operation of superconductive quantum interference devices in a manner which does not necessitate the establishment of any direct electrical connection with the superconductive quantum interference device.

The superconductive quantum interference device of the present invention may be defined as including a loop of superconducting material with a weak link positioned in the loop and with the loop of superconducting material and weak link enclosing an area for the reception of magnetic flux.

This invention is elucidated by the drawings in which.

Figure 2:
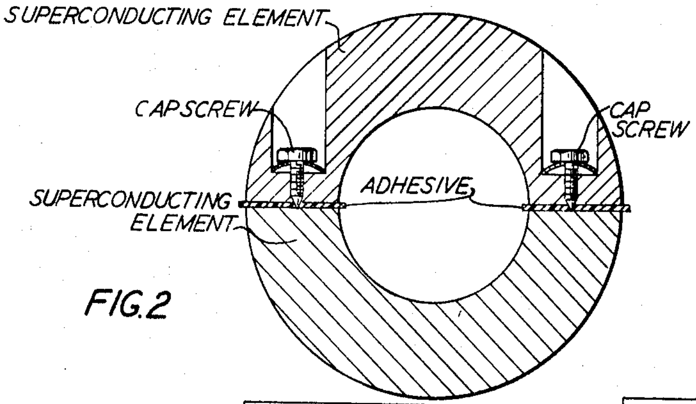
FIG. 2 is an end view, partially in section of the superconductive portion of the structure shown in FIG. 1.

The preferred form of this superconductive quantum interference device is shown in FIG. 2 and comprises two metal superconducting elements joined together to an insulating separator. This joint may be made by an suitable adhesive. The insulating separator is preferably a plastic material such as that available commercially as "Mylar." The two superconducting elements unite to form a conduit in the form of a central passageway through the body of the superconductive quantum interference device. A suitable dimension for the outside diameter of the superconductive quantum interference device shown in FIG. 2 is 1 cm.

Electrical contact is made between the two superconducting elements of the superconductive quantum interference device by means of two pointed cap screws that function as contact points and are received in suitable openings in one of the superconducting elements. The sharpened ends of the cap screws penetrate the insulation between the two superconducting elements permitting the flow of electrical current. By the adjustment of these two cap screws, the maximum supercurrent through the superconductive quantum interference device can be regulated. The significance of this supercurrent will be explained below.

The two superconducting elements and the cap screws are fabricated from metal capable of becoming superconductive at low temperature. These metals are well known. In the actual construction of the working superconductive quantum interference device, vanadium was employed as the two superconducting elements and the cap screws were niobium, although this invention is by no means so limited.

Figures 1, 3:
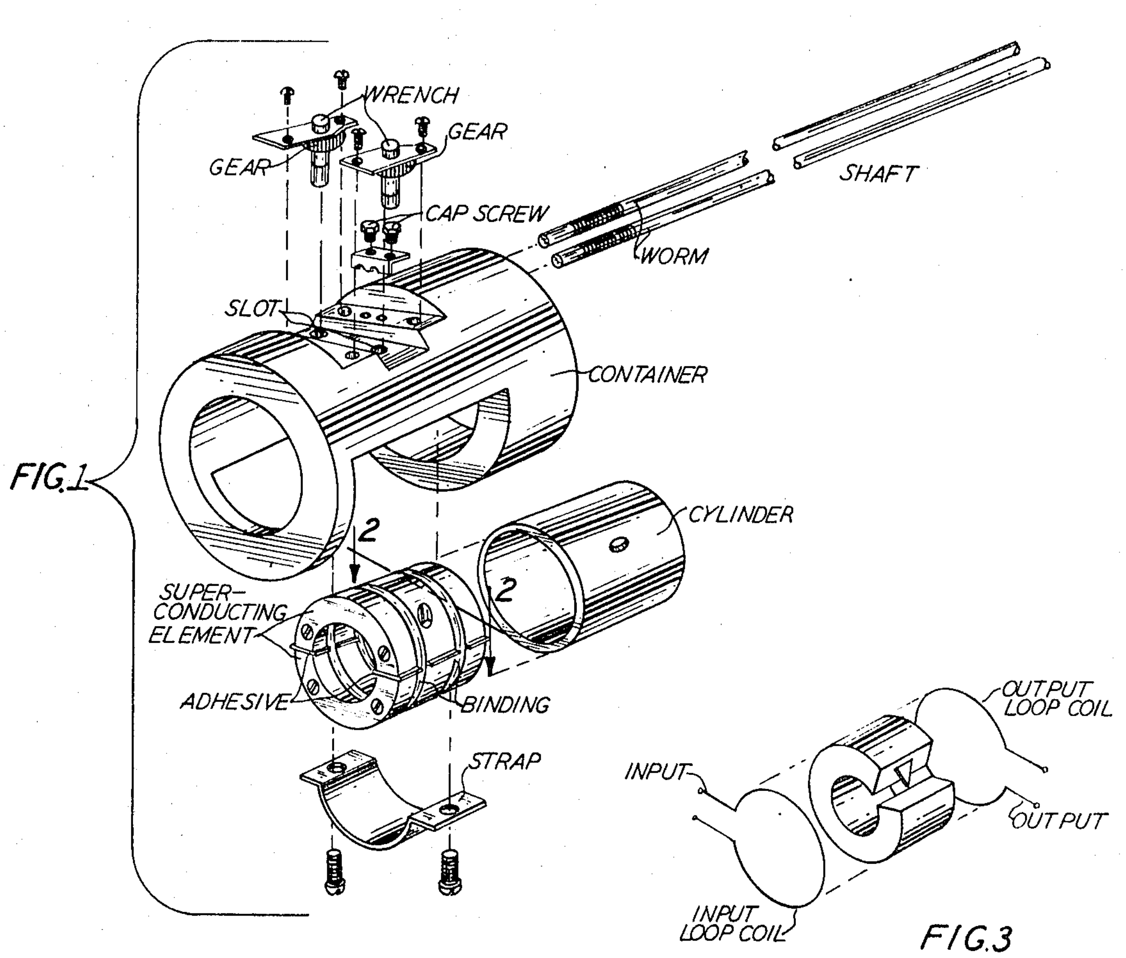
FIG. 1 is an exploded view of the parts of a superconductive quantum interference device which is useful in the execution of this invention.
FIG. 3 is a schematic representation of the superconductive quantum interference device and the adjacent coils.

An example of one form of superconductive quantum interference device of FIG. 2 can be seen in FIG. 1. Suitable binding surrounds the superconducting elements to insure against separation. The superconductive quantum interference device is inserted in a cylindrical insulator. A hollow cylindrical container, having one portion thereof cutaway, is adapted to receive the superconductive quantum interference device and cylindrical insulator. A suitable mounting is achieved by means of a strap partially surrounding the cylindrical insulator and attached to the container body by means of suitable fasteners.

Formed in the body of the container opposite the cutaway portion thereof is a slot of varying depth. Passageways are formed from this slot through the wall of the container to permit the passage of the pointed cap screws serving as contact points. A pair of female wrenches are mounted in the slot by means of suitable brackets and fasteners and are adapted to cooperate with the heads of the pointed cap screws. Formed integral with the shafts of these wrenches are worm gears. Longitudinal passageways are formed from the slot to one end wall of the container to permit the passage of adjusting shafts having worms formed near one end thereof. It may be seen that these worms cooperate with the worm gears so that rotation of the adjusting shafts will cause rotation of the pointed cap screws, thereby adjusting the electrical contact between the superconducting elements of the superconductive quantum interference device.

The superconductive quantum interference device may be assembled into working arrangement with input coils and output coils as shown in FIG. 3. It will be readily apparent to those skilled in the art that neither the input coil nor the output coil need take the form shown in FIG. 3. It is only necessary that the input coil and the output coil possess inductance and that they be magnetically adjacent the superconductive quantum interference device. Only the superconductive quantum interference device need be exposed to the cryogenic ambient necessary to render it superconductive. The input coil and output coil may be at any chosen temperature.

This invention is carried out by placing at least the superconductive quantum interference device in a cryogenic medium to render it superconductive and then placing an input coil and an output coil magnetically adjacent the superconductive quantum interference device. An alternating current $I_i$ is now applied to the input coil.

Figure 4:
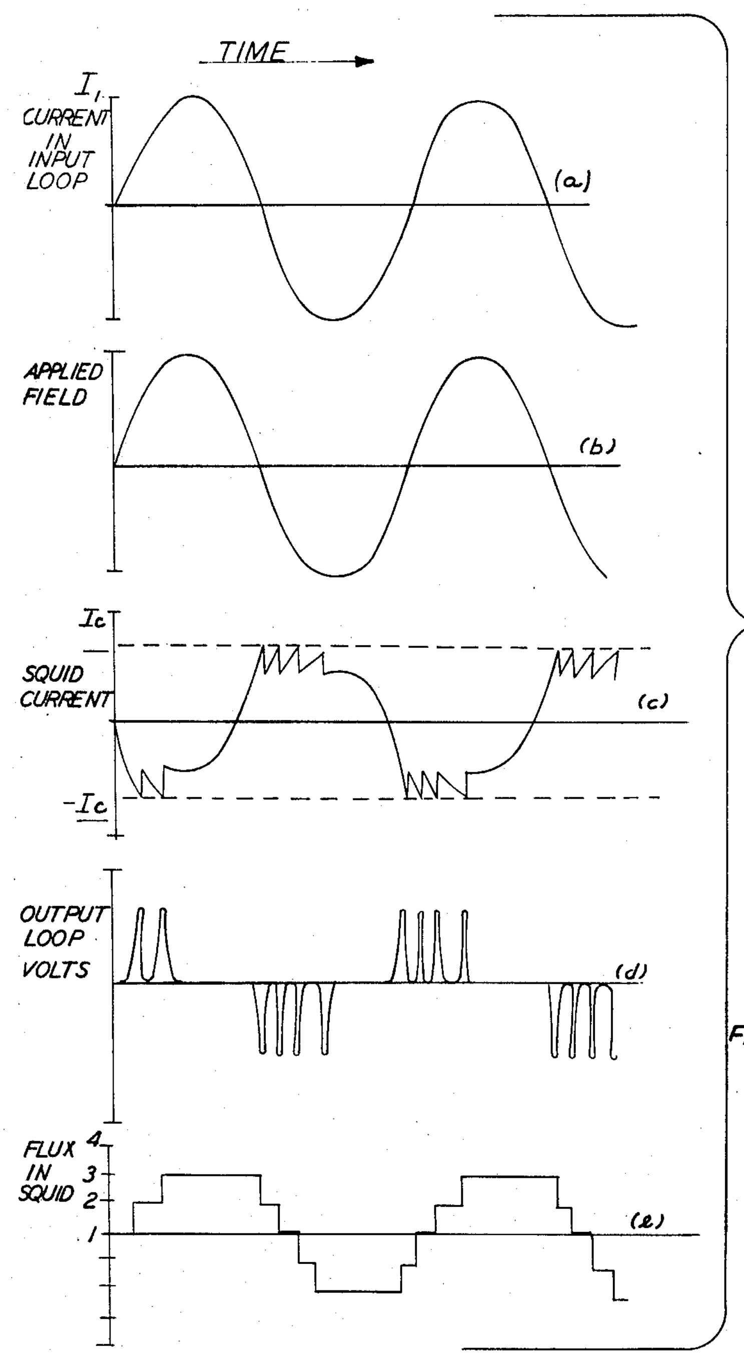
FIG. 4 is a series of curves demonstrating the operation of the invention.

FIG. 4 shows the current that would flow in the various loops of this circuit if an alternating current $I_i$, i, were applied to the input loop coil. This current, FIG. 4(*a*) would generate an alternating magnetic field, FIG. 4(*b*), which would be applied to the superconductive quantum interference device. Since the superconductive quantum interference device is superconducting, a current is induced in it which generates a magnetic field equal and opposite to the applied field in order to maintain the flux threading through its central hole at a constant value. This induced current, shown in FIG. 4(*c*), increases with the applied field until the critical current $I_c$, for the weak link is exceeded. At this current level, the weak link becomes a region of normal conduction and permits the passage of magnetic lines of force into the central hole of the superconductive quantum interference device thereby tending to equalize the applied field with the field within the superconductive quantum interference device.

Since quantum mechanics demands that changes in magnetic fields be carried out in units of the fundamental flux quantum ($2.07\times10^{17}$ gauss cm.$^2$) this adjustment of field between the inside and outside of the superconductive quantum interference device will continue until at least one flux quantum ($2.07\times10^{17}$ gauss cm.$^2$ times the superconductive quantum interference device hole area) has entered the superconductive quantum interference device. Once this is accomplished, the weak link becomes superconducting again and a superconducting current flows which is less than the critical value and keeps the inside of the superconductive quantum interference device shielded from the external field. As the external field continues to increase, this new current increases and if it reaches the critical value, another flux quantum can enter. Ordinarily only one flux quantum enters at a time, but jumps involving more than one have been observed in the laboratory. As the applied field decreases and reverses sign, the current in the superconductive quantum interference device also decreases, reverses sign and reaches its critical value in the reverse direction. In this case, the magnetic flux will flow out of the superconductive quantum interference device. Each time there is a change in the flux through the superconductive quantum interference device, there is also a flux change in the pickup coil loop which is closely coupled to the superconductive quantum interference device. The voltage output from this pickup is $(d\Phi/dt)$ (N) (K)where $d\Phi/dt$ is the rate of flux change, N the number of turns in the pickup coil and K its coupling coefficient to the superconductive quantum interference device.The rate of theflux change $d\Phi/dt$ may be estimated by dividing the number of quantized flux units entering or leaving the superconductive quantum interference device in a half cycle of the current applied to the input loop divided by the time for a half cycle of input current; i.e., $2n\Phi_o f$ where $f$ is the input frequency and $n$ is the number of flux quanta entering or leaving the superconductive quantum interference device. If the output coil has an inductance $L$, then one can shunt it with a capacitor of capacity C such that $LC=(2\pi f)^{12}$. This will increase the output voltage across the inductance at the frequency $f$ by the quality factor Q of the $LC$ combination. (The output voltage wave form shown in FIG. 4 ($d$) is for an output coil with a broad band, high frequency response.) If this tuned frequency $f$ is one of the harmonics in the Fourier expansion of the waveform in FIG. 4($d$), then the system pictured in FIG. 3 can be considered as a harmonic generator with the property that the amplitude of a particular harmonic can be controlled not only by the choice of driving frequency but also by the amplitude of the applied current.

Figure 5:
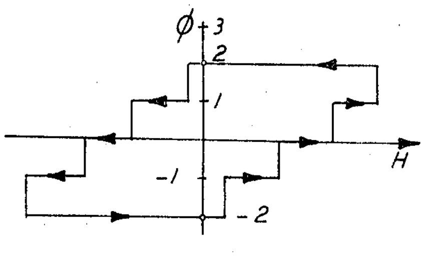
FIG. 5 is a graph of the effect of the applied field upon the flux in the superconductive quantum interference device.

Another valuable property of the circuit shown in FIG. 3 and the waveforms of FIG. 4, is the hysteresis accompanying the flow of flux into and out of the superconductive quantum interference device. FIG. 5 shows a graph of the flux in the superconductive quantum interference device hole as a function of the applied field. It can be seen that the flux in the superconductive quantum interference device hole at zero applied field is different depending upon the previous direction of the applied field. Thus, the system can be used as a memory element in which different information is stored by applying either a positive or negative magnetic field pulse. This stored information can be read destructively by looking for a flux transition when a small "read" field of one particular sign is applied. A nondestructive readout could be made with a separate superconductive quantum interference device which operates as a magnetometer and measures the flux stored in the memory superconductive quantum interference device.

The important element in FIG. 3 is the superconductive quantum interference device. Its behavior is controlled by three features:

1. The area of the central hole determines the overall sensitivity because the interesting effects occur when the applied magnetic field multiplied by this area equals a flux quantum ($2.07\times10^{17}$ gauss cm.$^2$). Thus effects will occur at every decreasing applied fields as the central hole is made larger.

2. The critical current of the weak link determines the superconducting current at which a quantum transition will occur. This critical current can be controlled by the choice of several possible weak link construction methods which will be discussed later.

3. The change in critical current at a transition is approximately $\Phi_0/L$ where $\Phi_0$ is the flux quantum and $L$ the inductance of the superconductive quantum interference device. This current change is in amperes if MKS units are used. ($\Phi_o=2.1\times10^{115}$ webers and $L$ is in Henries.)

The case described in FIG. 4 represents the situation in which the change in critical current ($\Phi_o/L$) is smaller than the critical current which the weak link can support. Thus, only a small fraction of the total current is changed at each transition and a considerable amount of hysteresis is introduced.

Figure 6:
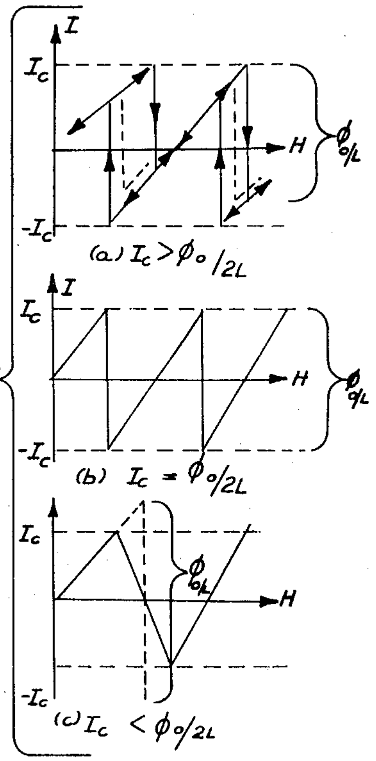
FIG. 6 is a graph of the superconductive quantum interference device current against the applied field for certain chosen values of $I_c$.

If the critical current becomes comparable to $\Phi_o/L$, then the total current in the loop is greatly changed at a quantum transition and very little hysteresis occurs. This type of operation is described in FIG. 6 where the current in the superconductive quantum interference device is plotted as a function of the applied field for the three cases ($a$)$2I_o>\Phi_0/L$, ($b$)$2I_o=\Phi_o/L$, and ($c$)$2I_o<\Phi_0/L$. (The characteristic curves given here are drawn as straight lines for simplicity of representation. In practice they may be curved depending on the detailed mechanical structure of the weak link.) Of these three characteristics the curve for $I_c/\approx\Phi_0/2L$ is the most interesting because the change in superconductive quantum interference device current when the critical current is reached is most abrupt. This produces the most rapid flux change in the superconductive quantum interference device and in the pickup loop coil coupled to it.

Figure 7:
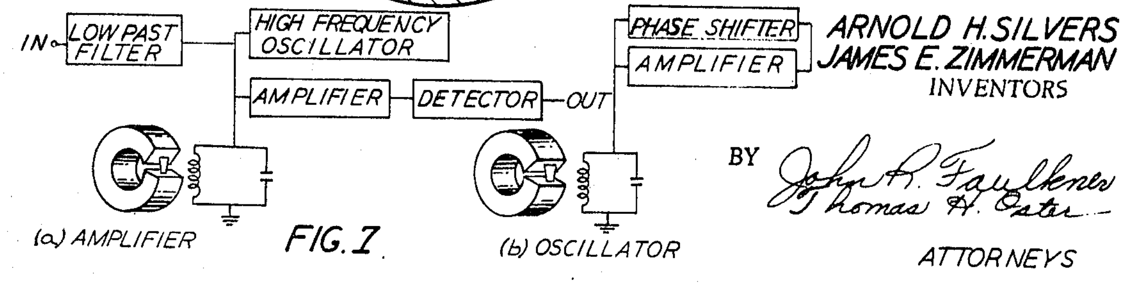
FIG. 7 is a schematic showing of a structure in which a single coil serves both as the input and output coil.

All of the circuits described above have had separate coils for the input and output loops. Such an arrangement is not necessary since one coil can be used for both purposes. FIG. 7 shows schematic drawings of an amplifier and an oscillator using this method of construction. Such a system also has the advantage that no electrical contact need be made to the superconductive quantum interference device itself. Thus, the superconductive quantum interference device can be placed alone in its cryogenic environment while the coupling coils and associated electronics can be outside in the room environment. Usually, however, the coil and superconductive quantum interference device are together in the cryostat in order to have close coupling.

The construction of the superconductive quantum interference device itself is relatively straightforward. Any superconducting material can be used and the shape need only be such that it have an inductance. Usually a material with a high normal to superconducting transition temperature is preferable so that the device can be operated well away from its transition temperature in a conventional liquid helium bath. The effects of temperature on the operating characteristics of the device are expected to become important only very near the transition temperature.

The construction of the weak link is very important to the operating characteristics. Any of the following techniques can be used.

1. Josephson tunneling films formed by evaporating or otherwise placing a thin film of an insulator between two superconductors. In such weak links, the critical current is determined by the insulating film thickness, its area of contact and the magnetic field that threads the junction itself. (Since these very thin films still have a finite area, the magnetic field which threads them can be important.) For this kind of weak link the current vs. applied field characteristic shown in FIG. 6 will be curved instead of straight.

2. Small metallic bridges between the two superconductors formed by evaporating a superconducting metal film into small holes in an insulating film or by evaporating a superconducting film through a mask so that only a small neck is formed to connect two large evaporated superconducting films. For these evaporated bridges, the critical current is determined by the dimensions of the bridge and cannot be changed after the film is evaporated. Such bridges can also be formed by mechanically removing the evaporated film in all but the small area where a bridge is desired.

3. Light mechanical contact between two bulk superconductors. These weak links may be formed by simply crossing two wires or by screwing a pointed superconducting screw against a bulk superconductor. Here the critical current is determined by the dimensions of the area of contact. The use of a pointed screw allows this area to be adjusted to the desired value after the superconductive quantum interference device is in place in its cryogenic environment.

We claim:

1. The process of inducing a nonlinear electrical current in a superconductive quantum interference device having a loop of superconducting material with a weak link positioned therein comprising placing the superconductive quantum interference device in the superconductive state in a cryogenic medium, locating an inductive member magnetically adjacent the superconductive quantum interference device and applying a varying current to the inductive device to induce a current in the superconductive quantum interference device, the magnitude of the varying current applied to the inductive member being sufficient to induce a critical current in said weak link whereby the current in the superconductive quantum interference device alternately increases to the value of the critical current through the weak link and decreases to some lower value as the number of flux quanta changes in the area enclosed by the superconducting material and weak link.

2. The process recited in claim 1 in which a further inductive member is placed magnetically adjacent the superconductive quantum interference device whereby voltages are generated in such further inductive member in response to the changes in the number of flux quanta in said area.

3. The process recited in claim 1 in which a further inductive member is placed magnetically adjacent the superconductive quantum interference device and at least partially magnetically shielded from the first mentioned inductive member by the superconductive quantum interference device whereby voltages are generated in said further inductive member in response to the changes in the number of flux quanta in said area.

4. The process recited in claim 1 in which the magnetic effects of the presence of the superconductive quantum interference device are detected directly in the magnetically adjacent inductive member.

5. The process recited in claim 1 in which only the superconductive quantum interference device is placed in the cryogenic medium.

6. The process recited in claim 1 in which the varying current applied to the inductive device is an alternating current having an amplitude during a substantial time period during both negative and positive excursions sufficient to induce a critical current in the weak link.